United States Patent
Cau et al.

(10) Patent No.: US 8,136,012 B2
(45) Date of Patent: Mar. 13, 2012

(54) METHOD AND SYSTEM FOR UPDATING TOPOLOGY CHANGES OF A COMPUTER NETWORK

(75) Inventors: Stéphane Cau, Rambouillet (FR); Julien Massiot, Paris (FR)

(73) Assignee: Infovista SA, Les Ulis (FR)

( * ) Notice: Subject to any disclaimer, the term of this patent is extended or adjusted under 35 U.S.C. 154(b) by 834 days.

(21) Appl. No.: 12/295,060

(22) PCT Filed: Mar. 23, 2007

(86) PCT No.: PCT/FR2007/000493
§ 371 (c)(1),
(2), (4) Date: Sep. 29, 2008

(87) PCT Pub. No.: WO2007/118957
PCT Pub. Date: Oct. 25, 2007

(65) Prior Publication Data
US 2009/0177953 A1   Jul. 9, 2009

(30) Foreign Application Priority Data
Mar. 31, 2006   (FR) ..................................... 06 02850

(51) Int. Cl.
*H03M 13/00* (2006.01)
(52) U.S. Cl. ........................................ 714/759; 714/800
(58) Field of Classification Search .................. 709/228, 709/723; 703/13; 370/242; 715/526; 714/801, 714/807, 759, 800
See application file for complete search history.

(56) References Cited

U.S. PATENT DOCUMENTS

| | | | |
|---|---|---|---|
| 5,751,967 A * | 5/1998 | Raab et al. | 709/228 |
| 6,430,150 B1 | 8/2002 | Azuma et al. | |
| 6,615,218 B2 * | 9/2003 | Mandal et al. | 1/1 |
| 7,103,807 B2 * | 9/2006 | Bosa et al. | 714/43 |
| 7,752,024 B2 * | 7/2010 | Ball et al. | 703/13 |
| 2004/0032852 A1 | 2/2004 | Thubert et al. | |
| 2004/0059807 A1 * | 3/2004 | Klotz et al. | 709/223 |
| 2006/0087976 A1 * | 4/2006 | Rhodes et al. | 370/242 |
| 2007/0214412 A1 * | 9/2007 | Arquie et al. | 715/526 |

* cited by examiner

*Primary Examiner* — David Ton
(74) *Attorney, Agent, or Firm* — Greer, Burns & Crain, Ltd.

(57) ABSTRACT

A method for detecting topology changes of a computer network, includes the following steps of acquisition of the raw data from the configuration tables of the network elements during successive primary pollings, the following steps being carried out between two successive primary pollings: calculation and storage of a checksum value for each network element having raw data which are considered to be sensitive, at least one secondary polling, allowing the sensitive data to be retrieved again from each corresponding element, comparison of the previously-stored checksum value, at each secondary polling and for each element termed sensitive, with a new checksum value calculated with the new sensitive data, for each sensitive element, when the two checksum values differ, updating in a topology database only the topology data relative to the corresponding element.

7 Claims, 2 Drawing Sheets

METHOD AND SYSTEM FOR UPDATING TOPOLOGY CHANGES OF A COMPUTER NETWORK

Figure 1:
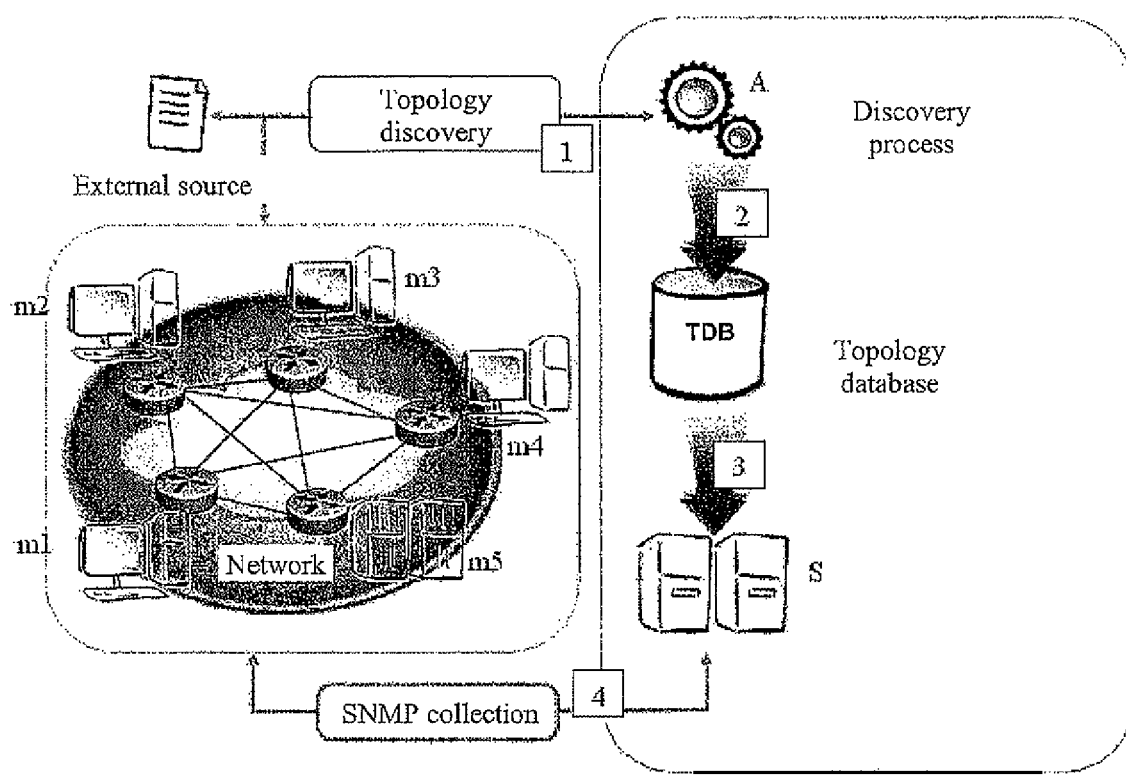

The present invention relates to a method and a system for updating topology changes of a computer network.

The standard mechanisms for managing and provisioning network topology are generally based on the total discovery of the infrastructure in a scheduled manner (daily, weekly, etc.) then updating in a topology database. The procedure can occupy an excessive quantity of resources and time. However, in the field of computer networks, mechanisms already exist which are capable of tracking particular changes, but the latter are based on time-recording meters, for example defining a user's last connexion on a given device, involving a change of configuration or not.

The use of these time-recording meters is a first approach, but is not capable of identifying configurations realized via external configuration tools using proprietary protocols or SNMP (Simple Network Management Protocol) sets. Another drawback of these meters is that they are based on the device overall and not on one or more very specific points (Technology, Configuration Element, etc.). Moreover, these meters can carry out updates even if the configuration has not changed, for example providing the user has simply saved the configuration before closing the console. These meters thus authorize unnecessary updates and sometimes deadlock changes.

The aim of the present invention is to remedy the above mentioned drawbacks by proposing a new method for detecting topology changes efficiently and rapidly.

The above aim is achieved with a method for detecting topology changes of a computer network, this method comprising the following steps:
acquisition of the raw data from the configuration tables of the network elements during successive primary pollings,
the following steps being carried out between two successive primary pollings:
calculation and storage of a checksum value for each network element having raw data which are considered to be sensitive,
at least one secondary polling, allowing said sensitive data to be retrieved again from each corresponding element,
comparison of the previously-stored checksum value, at each secondary polling and for each element termed sensitive, with a new checksum value calculated with the new sensitive data,
for each sensitive element, when the two checksum values differ, updating in a topology database only the topology data relative to the corresponding element.

For the elements which do not have sensitive raw data, the topology database is updated directly for these particular elements.

With the method according to the present invention, immediate verification can be performed on only the network node in which the change has occurred. Updating the whole of the network at all times, as in the prior art, is not carried out.

Advantageously, the raw data are considered to be sensitive when they conform to predetermined criteria contained in a configuration file.

The method according to the present invention thus makes it possible to track network topology changes according to configuration-defined criteria, and to verify that these criteria have not altered over time. This mechanism thus makes it possible to identify only the network elements requiring their configuration to be updated in the topology database, thus allowing third party products to be aware of any change as rapidly as possible, thus avoiding data losses and unnecessary latencies.

According to an advantageous characteristic of the invention, the primary and secondary pollings are regular; the secondary pollings being carried out at a frequency, for example a few minutes, substantially greater than the frequency of the primary pollings, on a daily basis for example. The procedure can therefore be executed automatically. Furthermore, the primary and secondary pollings can also be triggered following a predetermined event such as for example of the SNMP trap type, system event, task association in the configuration file, network startup, etc. This makes it possible to avoid the temporal granularity problems due to the scheduling of the polling process.

According to the invention, in order to update the topology data of a sensitive element, the sensitive raw data are retrieved from the cache memory, these sensitive raw data originating from the secondary polling which has just been carried out. This makes it possible to optimize the steps of network polling. In fact, in the raw data collected for the checksum calculation, certain data based on the configuration can be retained in the cache memory and will then be used, if necessary, for updating the topology database. This makes it possible to avoid "double-polling" and thus to protect the affected equipment from the stress associated with queries which are too close together (SNMP, ICMP stress).

By way of example, the value of the current checksum can be calculated by using a cyclical redundancy algorithm.

According to another aspect of the invention, a server is proposed for detecting topology changes of a computer network, this server comprising:
means for carrying out successive primary pollings of the network elements and acquiring raw data from the configuration tables of said network elements,
means for calculating and storing a checksum value for each network element having raw data which are considered to be sensitive,
means for carrying out at least one secondary polling, allowing said sensitive data to be retrieved again from each corresponding element,
means for comparing the previously-stored checksum value, at each secondary polling and for each element termed sensitive, with a new checksum value calculated with the new sensitive data,
for each sensitive element, when the two checksum values differ, means for updating in a topology database only the topology data relative to the corresponding element.

Figure 2:
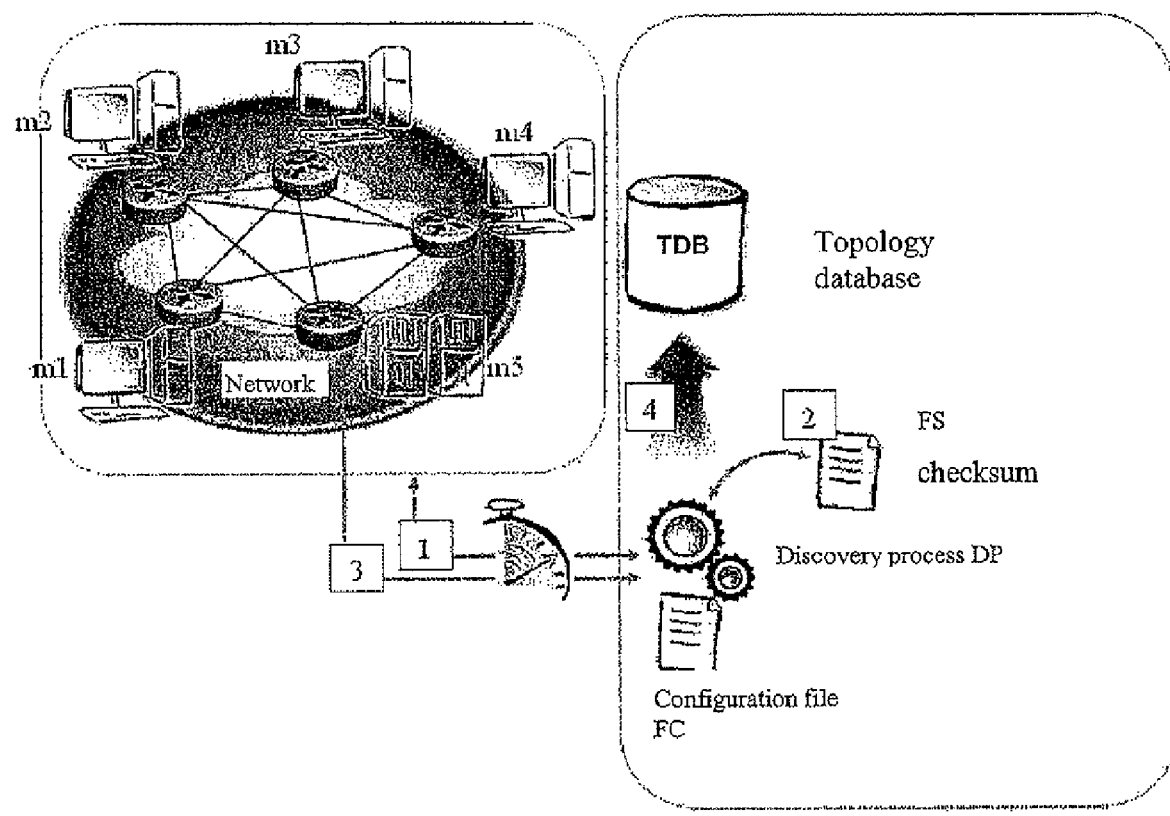

Other advantages and characteristics of the invention will become apparent on examination of the detailed description of an embodiment which is in no way limitative, and the attached drawings, in which:

FIG. 1 is a general diagrammatic view of a system according to the prior art, and FIG. 2 is a general diagrammatic view of the system according to the present invention.

In FIG. 1 according to the prior art, a computer network can be seen, equipped with a plurality of machines m1 to m5. The detection application according to the prior art comprises a discovery application A which is capable of polling the computer network, and optionally other external resources, in order to establish the topology of the network. This is step 1 of the topology discovery. At step 2, the topology data are stored in a topology database TDB. During the third step, information on the topology of this computer network is provided to servers S connected to said network. Then, using in particular the SNMP protocol, the servers S poll the network and take the performance data.

In other words, FIG. 1 illustrates the standard process of discovery and provisioning of a network infrastructure comprising essentially the following steps:
- Discovery of the group composing the network,
- Updating of the topology database,
- The topology is broken down on the servers,
- The servers start up the querying of the equipment and return the data.

The problem with the method according to the prior art is slowness and a reduced efficiency.

Moreover, in the architecture according to the prior art, all of the objects composing the network are regularly updated, involving a large transaction volume, and the need to carry out these operations in a very spaced-apart fashion.

The system according to the present invention proposes, by means of a simple configuration, tracking certain configuration elements, based on the storage in a file of the checksum value of the configuration tables parameterized by the user. The checksum value can be evaluated according to standard and robust algorithms of the CRC32 (Cyclic Redundancy Check) type. The system will evaluate in a regular (user-configurable) manner if the checksum value has changed, and if necessary update the element, and only the latter, in the topology database.

In FIG. 2 a system according to the present invention is shown. A computer network can be seen, constituted by a plurality of machines m1 to m5. The discovery application, DP for "discovery process", is associated with a configuration file FC and a file FS containing the checksum. The discovery application is capable of initializing the process of polling the network automatically. In fact the configuration file contains a schedule. Thus the primary polling of the network is launched in step 1. This primary polling is daily, for example. Raw data are taken from the configuration pages of the network elements. It is verified if the network elements include sensitive raw data, i.e. conforming to predetermined criteria and defined in the configuration file. For sensitive elements, the checksum is determined and stored in the file FS.

For "non sensitive" elements, updating is carried out in the topology database.

Then, for the sensitive elements, several successive and regular secondary pollings are carried out at step 3, but only on the sensitive elements (machines) in order to retrieve the sensitive raw data. At each secondary polling and for each sensitive element, a new checksum is calculated, which is compared with the previous checksum contained in the file FS. If on completing the comparison, the two checksums differ, then a change has occurred. In this case, only the topology data of the sensitive element being considered is updated.

The diagram of FIG. 2 therefore shows a procedure, according to the present invention, which makes it possible to track and update only the necessary elements. The steps of development can be summarized as follows:
- Launch in a scheduled fashion on the basis of the configuration file,
- Acquisition of the checksum and comparison with the previous one,
- Discovery of an object which has undergone configuration changes, and
- Updating of the topology database.

The present invention therefore makes it possible to track the configuration changes of a computer device and thus to update in a topology database the data relating to this device. A checksum value is calculated via the use of cyclical redundancy algorithms for monitoring the changes to the configuration tables of the devices. The invention makes it possible to update only the devices which have undergone changes, and this in a definite fashion, as the checksum is based on the configuration itself.

Of course, the invention is not limited to the examples which have just been described, and numerous adjustments can be made to these examples without exceeding the scope of the invention.

The invention claimed is:

1. A method for detecting topology changes of a computer network, this method comprising the following steps:
    acquisition of the raw data from the configuration tables of the network elements during successive primary pollings, the following steps being carried out between two successive primary pollings:
        calculation and storage of a checksum value for each network element having raw data which are considered to be sensitive;
        at least one secondary polling, allowing said sensitive data to be retrieved again from each corresponding element;
        comparison of the previously-stored checksum value, at each secondary polling and for each element termed sensitive, with a new checksum value calculated with the new sensitive data; and,
        for each sensitive element, when the two checksum values differ, updating in a topology database only the topology data relative to the corresponding element.

2. The method according to claim 1, characterized in that the raw data are considered to be sensitive when they conform to predetermined criteria contained in a configuration file.

3. The method according to claim 1, characterized in that the primary and secondary pollings are regular; the secondary pollings being performed at a frequency substantially greater than the frequency of the primary pollings.

4. The method according to claim 1, characterized in that the primary and secondary pollings are triggered following a predetermined event.

5. The method according to claim 1, characterized in that for the updating of the topology data of a sensitive element, the sensitive raw data contained in the cache memory are retrieved, these sensitive raw data originating from the secondary polling just carried out.

6. The method according to claim 1, characterized in that the current checksum value is calculated using a cyclical redundancy algorithm.

7. A server for detecting topology changes of a computer network, this server comprising:
    means for carrying out successive primary pollings of the network elements and acquiring raw data from the configuration tables of said network elements;
    means for calculating and storing a checksum value for each network element having raw data which are considered to be sensitive;
    means for carrying out at least one secondary polling, allowing said sensitive data to be retrieved again from each corresponding element;
    means for comparing the previously-stored checksum value, at each secondary polling and for each element termed sensitive, with a new checksum value calculated with the new sensitive data; and
    for each sensitive element, when the two checksum values differ, means for updating in a topology database only the topology data relative to the corresponding element.

* * * * *